United States Patent
Shpunt

(10) Patent No.: US 9,215,449 B2
(45) Date of Patent: *Dec. 15, 2015

(54) IMAGING AND PROCESSING USING DUAL CLOCKS

(71) Applicant: PRIMESENSE LTD., Tel Aviv (IL)

(72) Inventor: Alexander Shpunt, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/907,998

(22) Filed: Jun. 3, 2013

(65) Prior Publication Data

US 2013/0278787 A1    Oct. 24, 2013

Related U.S. Application Data

(63) Continuation of application No. 13/885,688, filed as application No. PCT/IB2011/055155 on Nov. 17, 2011.

(60) Provisional application No. 61/415,352, filed on Nov. 19, 2010.

(51) Int. Cl.
*H04N 13/02* (2006.01)
*H04N 5/376* (2011.01)
(Continued)

(52) U.S. Cl.
CPC ............ *H04N 13/0271* (2013.01); *G01B 11/25* (2013.01); *H04N 5/3765* (2013.01); *H04N 5/37452* (2013.01); *G02B 7/40* (2013.01)

(58) Field of Classification Search
CPC . H04N 5/2256; H04N 5/2354; H04N 5/3355; H04N 5/3745; H04N 5/37452; H04N 5/37455; H04N 5/3765; H04N 5/378; G06K 9/2027; G06K 9/2036; G06K 9/4661; G06K 2209/401; G06T 7/0053; G06T 7/0057; G01B 11/026; G01B 11/14; G01B 11/22; G01B 11/25–11/2545
USPC ............... 348/50, 135, 262, 363, 370, 371; 356/3–22, 608; 382/115; 359/386
See application file for complete search history.

(56) References Cited

U.S. PATENT DOCUMENTS 3,796,498 A    3/1974  Post
4,336,978 A    6/1982  Suzuki
(Continued)

FOREIGN PATENT DOCUMENTS

JP    01-240863    9/1989
JP    06-273432    9/1994
(Continued)

OTHER PUBLICATIONS

McDonald et al., "A New Approach to Active Illumination," BMVC 91: Proceedings of the British Machine Vision Conference, Organized for the British Machine Vision Association by the Turing Institute, Sep. 23-26, 1991, University of Glasgow.*

(Continued)

*Primary Examiner* — Dennis Hogue
(74) *Attorney, Agent, or Firm* — D. Kliger I.P. Services Ltd.

(57) ABSTRACT

A method for imaging includes capturing images of an object using a matrix of detector elements and performing a processing operation in the detector elements under control of a global clock. Results of the processing operation are read out under control of a rolling clock, which is unsynchronized with the global clock.

16 Claims, 6 Drawing Sheets

(51) Int. Cl.
*H04N 5/3745* (2011.01)
*G01B 11/25* (2006.01)
*G02B 7/40* (2006.01)

(56) References Cited

U.S. PATENT DOCUMENTS

| | | | |
|---|---|---|---|
| 5,406,543 | A | 4/1995 | Kobayashi et al. |
| 6,031,611 | A | 2/2000 | Rosakis et al. |
| 6,041,140 | A | 3/2000 | Binns et al. |
| 6,075,605 | A | 6/2000 | Futamura et al. |
| 6,081,269 | A | 6/2000 | Quarendon |
| 6,377,700 | B1 | 4/2002 | Mack et al. |
| 6,494,837 | B2 | 12/2002 | Kim et al. |
| 6,495,848 | B1 | 12/2002 | Rubbert |
| 6,707,027 | B2 | 3/2004 | Liess et al. |
| 7,006,952 | B1 | 2/2006 | Matsumoto et al. |
| 7,659,995 | B2 | 2/2010 | Knighton et al. |
| 7,700,904 | B2 | 4/2010 | Toyoda et al. |
| 7,751,063 | B2 | 7/2010 | Dillon et al. |
| 7,811,825 | B2 | 10/2010 | Fauver et al. |
| 7,840,031 | B2 | 11/2010 | Albertson et al. |
| 2001/0016063 | A1 | 8/2001 | Albeck et al. |
| 2002/0041327 | A1 | 4/2002 | Hildreth et al. |
| 2003/0015647 | A1* | 1/2003 | Guo et al. ............... 250/208.1 |
| 2004/0082112 | A1 | 4/2004 | Stephens |
| 2004/0223075 | A1* | 11/2004 | Furlan et al. ............... 348/363 |
| 2005/0231465 | A1 | 10/2005 | DePue et al. |
| 2007/0046924 | A1 | 3/2007 | Chang |
| 2007/0057946 | A1 | 3/2007 | Albeck et al. |
| 2007/0165243 | A1 | 7/2007 | Kang et al. |
| 2007/0182949 | A1* | 8/2007 | Niclass ............... 356/3 |
| 2007/0262985 | A1 | 11/2007 | Watanabe et al. |
| 2008/0031513 | A1 | 2/2008 | Hart |
| 2008/0285827 | A1 | 11/2008 | Meyer et al. |
| 2009/0016642 | A1 | 1/2009 | Hart |
| 2009/0090937 | A1 | 4/2009 | Park |
| 2009/0295951 | A1 | 12/2009 | Fowler et al. |
| 2010/0128221 | A1 | 5/2010 | Muller et al. |
| 2010/0194745 | A1 | 8/2010 | Leister et al. |
| 2010/0321773 | A1 | 12/2010 | Chen et al. |
| 2011/0043403 | A1 | 2/2011 | Loffler |
| 2011/0050859 | A1* | 3/2011 | Kimmel et al. ............... 348/50 |
| 2011/0164132 | A1* | 7/2011 | Buettgen et al. ............... 348/135 |
| 2011/0295331 | A1 | 12/2011 | Wells et al. |
| 2012/0269404 | A1 | 10/2012 | Hassebrook et al. |

FOREIGN PATENT DOCUMENTS

| | | | |
|---|---|---|---|
| JP | 2001141430 | A | 5/2001 |
| JP | 2002122417 | A | 4/2002 |
| JP | 2011118178 | A | 6/2011 |
| WO | 9828593 | A2 | 7/1998 |

OTHER PUBLICATIONS

U.S. Appl. No. 12/330,766 Office Action dated Jul. 16, 2013.
International Application PCT/IB2013/051986 Search Report dated Jul. 30, 2013.
U.S. Appl. No. 13/008,042 Office Action dated Jul. 15, 2013.
U.S. Appl. No. 12/844,864 Office Action dated Sep. 26, 2013.
U.S. Appl. No. 13/921,224 Office Action dated Oct. 3, 2013.
U.S. Appl. No. 12/958,427 Office Action dated Nov. 22, 2013.
U.S. Appl. No. 13/567,095 Office Action dated Oct. 1, 2013.
U.S. Appl. No. 13/008,042 Office Action dated Dec. 3, 2013.
Japanese Patent Application No. 2008558981 Official Action dated Nov. 2, 2011.
U.S. Appl. No. 12/522,171 Official Action dated Dec. 22, 2011.
U.S. Appl. No. 12/522,172 Official Action dated Nov. 30, 2011.
Japanese Patent Application No. 2008558984 Official Action dated Nov. 1, 2011.
U.S. Appl. No. 13/043,488 Official Action dated Jan. 3, 2012.
Japanese Patent Application No. 2008535179 Official Action dated Nov. 8, 2011.
Chinese Patent Application No. 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 13/885,688 Office Action dated Feb. 17, 2015.
McDonald et al., "A new approach to active Illumination", Proceedings of the British machine vision conference organized for the British machine vision association by the Turing Institute, 7 pages, Sep. 23-26, year 1991.
Salvi et al., "Pattern codification strategies in structured light systems", Journal of the pattern recognition society pp. 827-849, year 2004.
Ishii et al., "High-speed 3D image acquisition using codded structured light projection", Proceeding of the 2007 IEEE/RSJ International Conference on Intelligent robots and systems, pp. 925-930, Oct. 29-Nov. 2, 2007.

\* cited by examiner

⋮

IMAGING AND PROCESSING USING DUAL CLOCKS

CROSS-REFERENCE TO RELATED APPLICATION

This application is a continuation of U.S. patent application Ser. No. 13/885,688, filed May 16, 2013, in the national phase of PCT Patent Application PCT/IB2011/055155, filed Nov. 17, 2011, which claims the benefit of U.S. Provisional Patent Application 61/415,352, filed Nov. 19, 2010. All of these related applications are incorporated herein by reference.

FIELD OF THE INVENTION

The present invention relates generally to computer vision, and specifically to three-dimensional (3D) mapping and imaging.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

SUMMARY

Embodiments of the present invention that are described hereinbelow provide improved methods and apparatus for 3D mapping.

There is therefore provided, in accordance with an embodiment of the present invention, a method for depth mapping, which includes illuminating an object with a time-coded pattern and capturing images of the time-coded pattern on the object using a matrix of detector elements. The time-coded pattern in the captured images is decoded using processing circuitry embedded in each of the detector elements so as to generate respective digital shift values, which are converted into depth coordinates.

In some embodiments, illuminating the object includes projecting a temporal sequence of spatial patterns of light onto the object, wherein the spatial patterns may include alternating bright and dark stripes, having a different, respective spatial frequency in each of the spatial patterns. Alternatively or additionally, the spatial patterns may include one or more gray-scale patterns.

Further additionally or alternatively, capturing the images includes capturing multiple successive image frames, wherein the temporal sequence extends over a given number of the successive image frames, and decoding the time-coded pattern includes combining signals from the given number of the successive image frames.

Projecting the temporal sequence may include scanning an illumination beam along a first axis, while modulating the beam, and applying a cylindrical optical element to generate the spatial patterns by spreading the modulated beam along a second axis, perpendicular to the first axis. Alternatively, projecting the temporal sequence may include providing a patterned element including multiple areas, which when illuminated, created respective ones of the spatial patterns, and illuminating the areas sequentially so as to project the temporal sequence of the spatial patterns.

In some embodiments, capturing the images includes generating electrical charge in each of the detector elements responsively to the time-coded pattern, and decoding the pattern includes switching the charge among different charge storage components in each of the detector elements in synchronization with the time-coded pattern. In a disclosed embodiment, the temporal sequence and switching the charge are synchronized by a global clock, and decoding the pattern includes reading data out of the matrix of the detector elements under control of a local clock, which is unsynchronized with the global clock. Typically, the matrix includes multiple rows of the detector elements, and reading the data out includes outputting the data from the detector elements row by row using a rolling shutter controlled by the local clock.

In a disclosed embodiment, decoding the pattern includes making a comparison of the charge stored in each of the charge storage components to a threshold level, generating bit values responsively to the comparison, and concatenating the bit values to generate the respective digital shift values.

Additionally or alternatively, decoding the pattern includes combining signals from the charge storage components in groups of neighboring detector elements so as to provide the depth coordinates with enhanced depth resolution.

In another embodiment, illuminating the object includes projecting a temporal sequence of spatial patterns of light onto the object, and capturing the images includes capturing multiple successive image frames, wherein the temporal sequence extends over a given number of the successive image frames, and decoding the pattern includes combining signals from the given number of the successive image frames while combining the signals from groups of neighboring detector elements.

Typically, decoding the pattern includes storing reference values corresponding to an image of the time-coded pattern at a predefined reference frame, and decoding the pattern includes generating respective output words from the detector elements based on a captured image, and taking differences between the respective output words and the stored reference values in order to find the digital shift values. Converting the shift values may include generating a depth map of the object by triangulation of the digital shift values.

There is also provided, in accordance with an embodiment of the present invention, a method for imaging, which includes capturing images of an object using a matrix of detector elements. A processing operation is performed in the detector elements under control of a global clock. Results of the processing operation are read out under control of a rolling clock, which is unsynchronized with the global clock.

In a disclosed embodiment, capturing the images includes generating electrical charge in each of the detector elements, and performing the processing operation includes applying a logical operation to the charge in each of the detector elements in order to generate a digital value, which is read out under the control of the rolling clock. Capturing the images may include illuminating the object with radiation that varies over time under the control of the global clock, and generating the charge responsively to the radiation that is received from the object at the detector elements.

There is additionally provided, in accordance with an embodiment of the present invention, apparatus for depth mapping, including an illumination subassembly, which is configured to illuminate an object with a time-coded pattern. An image capture subassembly includes a matrix of detector elements configured to capture images of the time-coded pattern on the object. Processing circuitry is embedded in each of the detector elements and is configured to decode the time-coded pattern in the captured images so as to provide signals indicative of respective digital shift values. A processor is configured to convert the shift values into depth coordinates.

There is further provided, in accordance with an embodiment of the present invention, apparatus for imaging, which includes a matrix of detector elements, which is configured to capture images of an object. Embedded processing circuitry is configured to perform a processing operation in the detector elements under control of a global clock. A readout circuit is configured to read out results of the processing operation under control of a rolling clock, which is unsynchronized with the global clock.

There is moreover provided, in accordance with an embodiment of the present invention, projection apparatus, including a radiation source, which is configured to generate an illumination beam, and scanning optics, which are configured to scan the illumination beam along a first axis. A control circuit is coupled to modulate the illumination beam while the beam is scanned. A cylindrical optical element is configured to generate one or more spatial patterns by spreading the modulated beam along a second axis, perpendicular to the first axis.

In a disclosed embodiment, the control circuit is configured to pulse the illumination beam on and off while the beam is scanned so as to generate a pattern of stripes along the second axis. A modulation of the illumination beam may be varied so as to generate the stripes with different widths.

There is furthermore provided, in accordance with an embodiment of the present invention, projection apparatus, which includes a patterned element including multiple areas, which when illuminated, create different, respective spatial patterns. At least one radiation source is configured to illuminate the areas sequentially so as to project the spatial patterns in a temporal sequence.

In a disclosed embodiment, the at least one radiation source includes an array of radiation sources, which are configured to irradiate different, respective ones of the areas, and the apparatus includes a control circuit, which is coupled to turn the radiation sources on and off in succession so as to create the temporal sequence of the spatial patterns.

The present invention will be more fully understood from the following detailed description of the embodiments thereof, taken together with the drawings in which:

DETAILED DESCRIPTION OF EMBODIMENTS

Pattern-based systems and methods for depth mapping such as those described in the Background section above require that a processor perform multiple correlation computations in order to find the local shift of each pixel or group of pixels relative to a reference image. The computations require substantial computing and/or hardware logic resources and are limited in the spatial resolution that they are able to achieve.

Embodiments of the present invention that are described hereinbelow provide circuits and methods that can be used to overcome these limitations by using time-coded illumination in combination with an image sensor that decodes the time coding at each pixel. The resulting system is thus able to provide a digital shift value for each pixel simply by digital subtraction, with no need for correlation or other complex computations. The shift value is converted to depth by triangulation, as in other pattern-based depth mapping systems.

Figure 1:
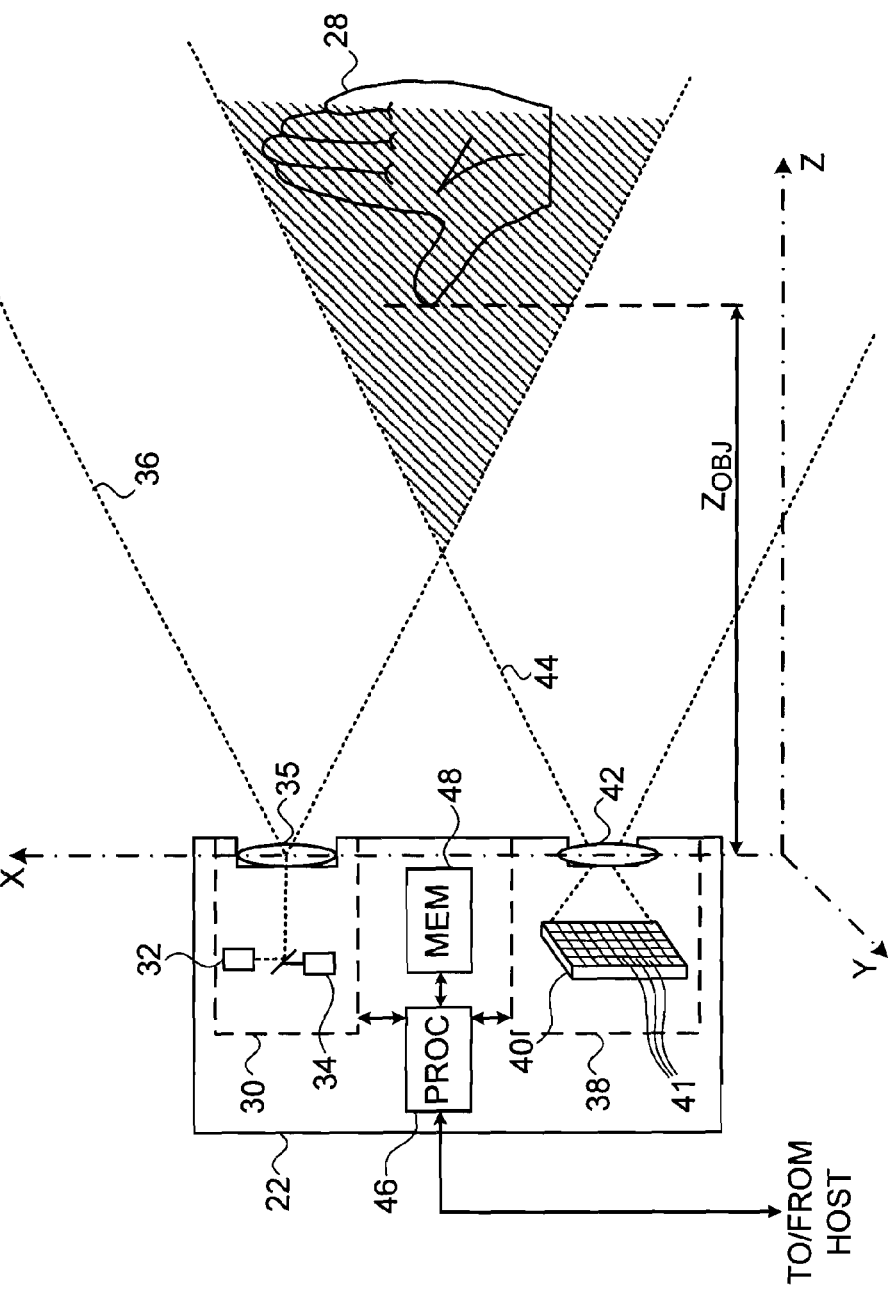
FIG. 1 is a schematic side view of an imaging device for 3D mapping, in accordance with an embodiment of the present invention.

FIG. 1 is a schematic top view of an imaging device 22 for 3D mapping, in accordance with an embodiment of the present invention. Imaging device 22 is configured to capture images and generate 3D maps of a scene. The scene here includes an object 28, such as the hand of a user of the device, which is located at a distance $Z_{OBJ}$ from device 22. The depth information in the 3D maps generated by device 22 may be used by a host computer as part of a 3D user interface, which enables the user to interact with games and other applications running on the computer and with elements shown on a display screen. (This sort of functionality is described, for example, in U.S. Patent Application Publication 2009/0183125, whose disclosure is incorporated herein by reference.) This particular application of device 22 is mentioned here only by way of example, however, and the 3D mapping capabilities of the device may be used for other purposes, as well, and applied to substantially any suitable types of scenes and 3D objects.

In the example shown in FIG. 1, an illumination subassembly 30 in imaging device 22 projects a time-coded pattern of optical radiation onto object 28, as will be explained hereinbelow. The optical radiation that is used for this purpose is typically in the infrared (IR) range, but visible or ultraviolet radiation may similarly be used. (The term "optical radiation," as used in the context of the present patent application and in the claims, refers to electromagnetic radiation in any or all of the visible, infrared, and ultraviolet ranges, which is equivalently referred to as visible, infrared, or ultraviolet light.) An image capture subassembly 38 captures and decodes images of the pattern on the object in order to generate a digital shift value for each pixel.

A processor 46 in device 22 processes the shift values in order to generate a depth map of object 28, i.e., an array of 3D coordinates, comprising a depth (Z) coordinate value of the surface of the object at each point (X,Y) within a predefined field of view. (In the context of an array of image-related data, these (X,Y) points are also referred to as pixels.) In the present embodiment, the processor computes the 3D coordinates of points on the surface of the object 28 by triangulation, based on the transverse shift of the pattern at each pixel. The principles of the triangulation computation are described in the above-mentioned PCT publications WO 2007/043036, WO 2007/105205 and WO 2008/120217. This sort of technique is referred to herein generally as "pattern-based depth mapping." The embodiments described in the present patent application use time-coded illumination patterns and dedicated decoding circuitry to provide processor 46 with the transverse shift value at each pixel accurately and efficiently.

In FIG. 1, the X-axis is taken to be the horizontal direction along the front of device 22, the Y-axis is the vertical direction (out of the page in this view), and the Z-axis extends away from device 22 in the general direction of the object being imaged by the assembly. The optical axes of subassemblies 30 and 38 are parallel to the Z-axis, with respective pupils on the X-axis at a known distance apart. This sort of arrangement is useful in simplifying the shift-based computations performed by processor 46, but other optical arrangements may alternatively be used to implement the principles described herein, and these alternative arrangements are considered to be within the scope of the present invention.

Figure 4A:
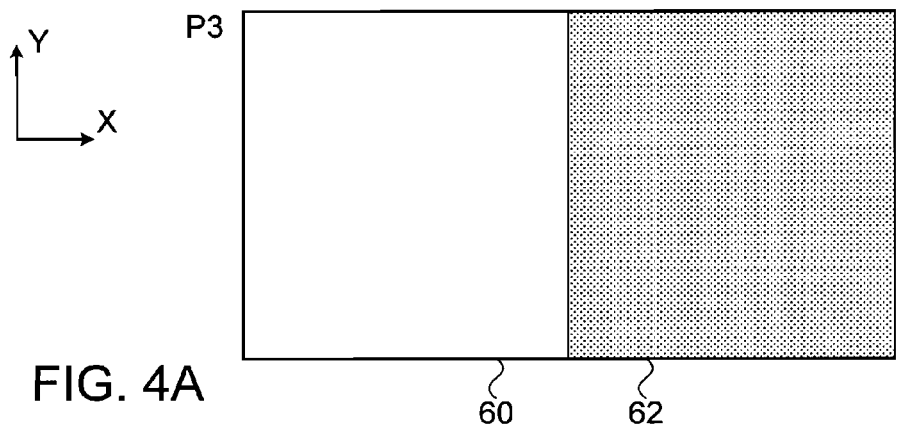
FIGS. 4A, 4B and 4C schematically show patterns projected by an illumination subassembly, in accordance with an embodiment of the present invention.
Figure 4B:
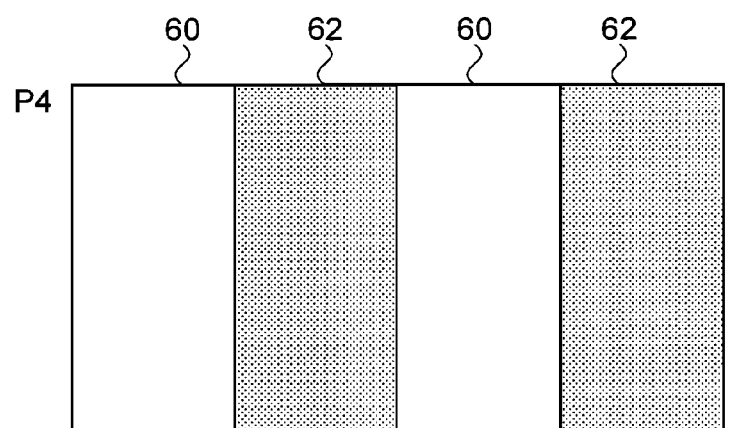
Figure 4C:
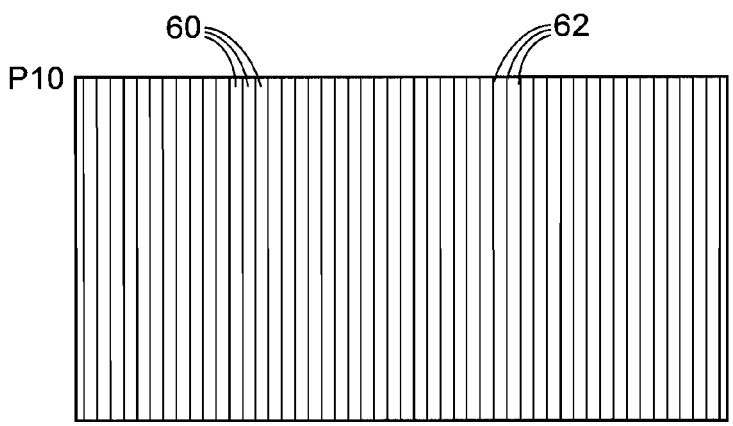

As noted above, illumination subassembly 30 illuminates the scene of interest with a time-coded pattern, such as a succession of patterns of vertical stripes, wherein the stripe width varies in time. Such a pattern is illustrated in FIGS. 4A-4C and is described hereinbelow with reference thereto. To generate this sort of pattern, subassembly 30 typically comprises a suitable radiation source 32, such as a collimated diode laser or an appropriately shaped light-emitting diode (LED) or other light source, along with scanning optics, such as a scanning mirror 34 and projection optics 35. The beam from source 32 is modulated, for example, pulsed on and off, during each excursion of scanning mirror 34 along the X-axis, with modulation timed to generate the stripes with the desired spatial frequencies. Optics 35 may comprise a cylindrical lens or other cylindrical optical element, which spreads the output spot from source 32 into an output stripe along the Y-direction. In this case, it is sufficient that mirror 34 scan in a single dimension, along the X-axis. The pattern is projected onto the scene in a diverging beam 36. Alternatively, a two-dimensional scanning mirror, which may be driven using micro-electro-mechanical system (MEMS) technology, for example, in conjunction with a collimated laser diode can be used to create a full two-dimensional illumination pattern.

Figure 6:
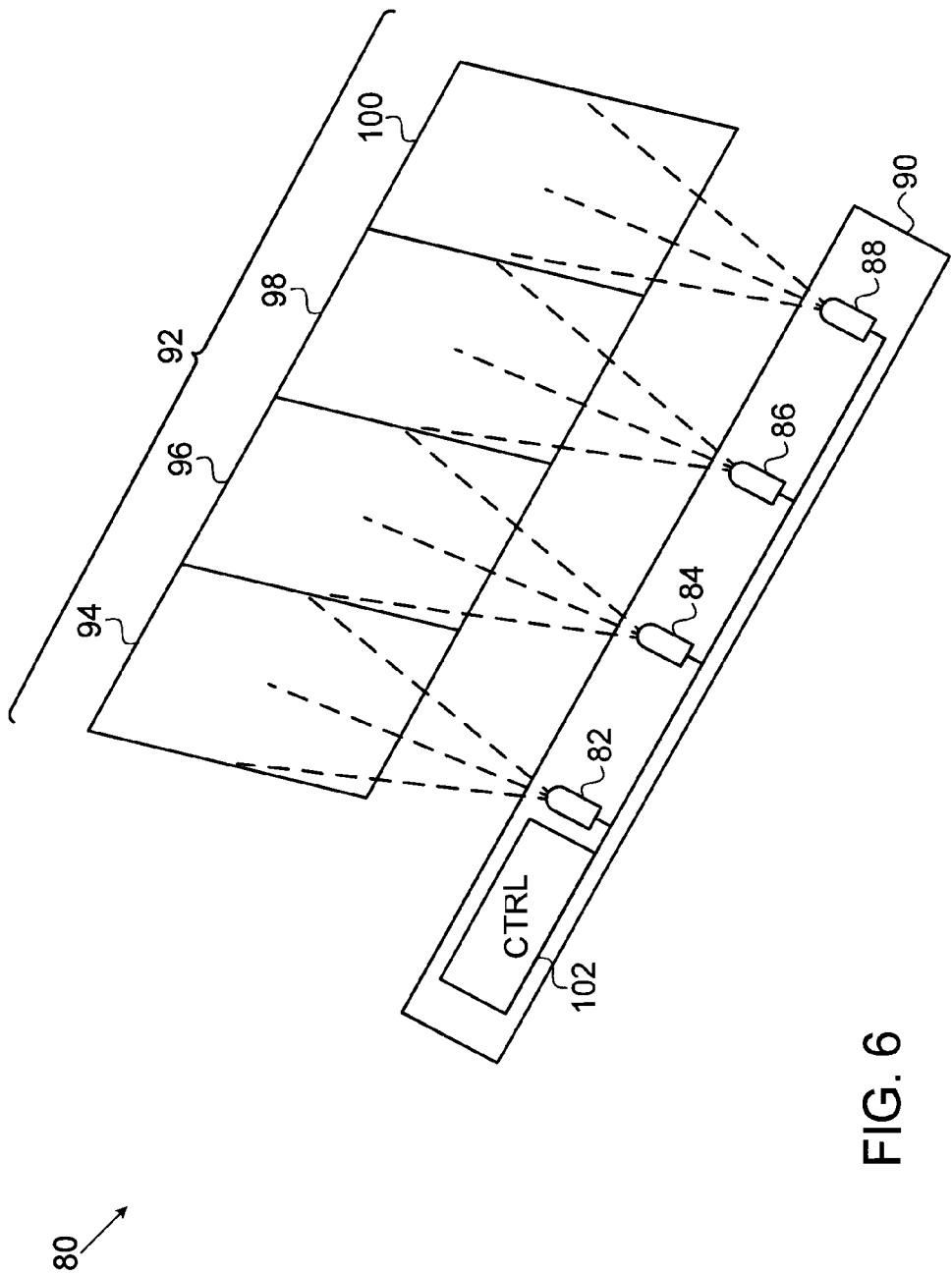
FIG. 6 is a schematic pictorial view of an illumination subassembly, in accordance with an embodiment of the present invention.

Further alternatively, other sorts of illumination subassemblies may be used to create the time-coded pattern. For example, a spatial light modulator may be driven to generate the pattern over the entire field of view simultaneously, without scanning. As another example, an array of parallel radiation sources may be modulated, for example sequentially turned on and off in turn, with appropriate timing to create the time-coded pattern. In this latter case, the radiation sources may be associated with suitable patterned optics, such as a diffractive optical element (DOE) or micro-lens array (MLA), for projection of the pattern. The density and/or other aspects of the pattern may vary across the surface of the optics, so that as each radiation source is turned on, it creates a different spatial pattern in the time-coded sequence. An embodiment of this sort is shown in FIG. 6.

Image capture subassembly 38 typically comprises objective optics 42, which image the scene onto a detector 40, which may be based on CMOS image sensor technology, comprising a matrix of detector elements 41. The rows and columns of the matrix are aligned with the X and Y axes. Each element 41 of detector 40 comprises a local processing circuit, which generates the digital shift value of the corresponding pixel. The detector and objective optics define a field of view 44, which is typically contained within beam 36 in the region of interest of device 22.

As noted above, radiation source 32 typically emits IR radiation. Detector 40 may comprise a monochrome image sensor, without an IR-cutoff filter, in order to detect the image of the projected pattern with high sensitivity. To enhance the contrast of the image captured by detector 40, optics 42 or the detector itself may comprise a bandpass filter (not shown), which passes the wavelength of radiation source 32 while blocking ambient radiation in other bands.

Processor 46 typically comprises an embedded microprocessor, which is programmed in software (or firmware) to carry out the processing functions that are described herein. A memory 48 may hold program code, lookup tables, and/or interim computational results. Alternatively or additionally, processor 46 may comprise programmable hardware logic circuits for carrying out some or all of its functions.

Figure 2:
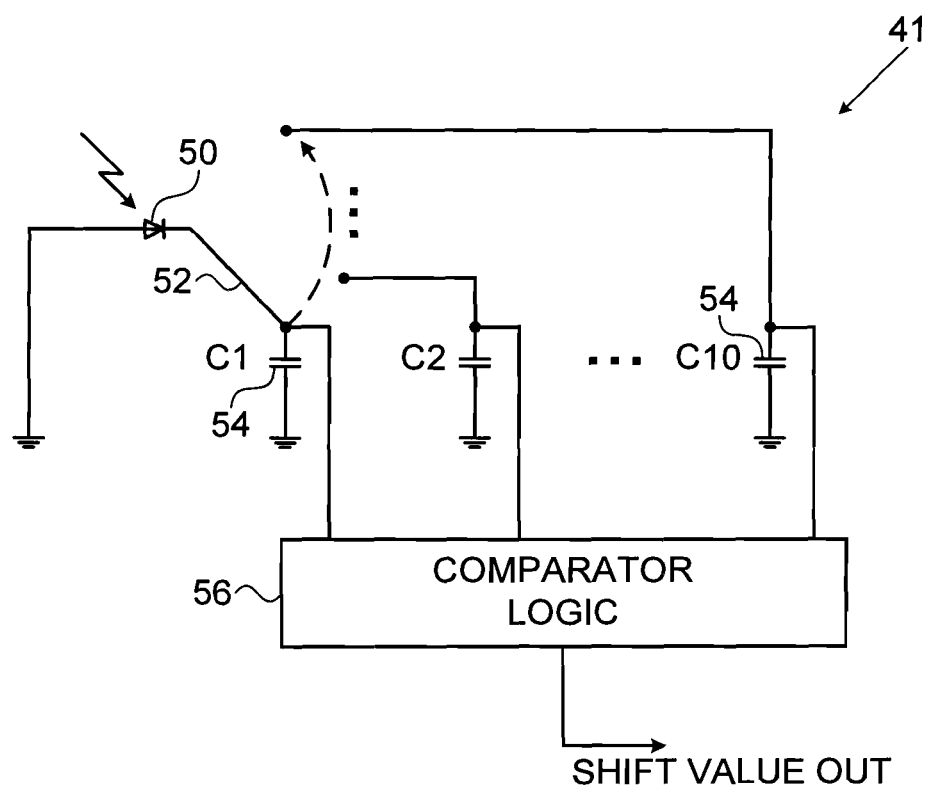
FIG. 2 is a schematic circuit diagram showing a detector element with an embedded processing circuit, in accordance with an embodiment of the present invention.

FIG. 2 is a schematic circuit diagram showing processing circuits embedded in each of detector elements 41 in detector 40, in accordance with an embodiment of the present invention. All of the components of detector 40, including both light sensing and logic circuits, may be produced by standard CMOS processes, such as are currently used in producing CMOS image sensors.

A photodiode 50 or other light-sensitive component in each element 41 generates a flow of electrons in response to incident photons. The processing circuitry in each element 41 includes at least a switch 52 and multiple charge storage components, such as capacitors 54. Switch 52 is coupled to the output of photodiode 50 and switches among capacitors 54, which store the electron charge. In this example, element 41 comprises an array of ten capacitors, but larger or smaller numbers of capacitors may be used depending on the desired shift resolution. Comparator logic 56 converts the charge stored by the capacitors into a signal indicative of a digital shift value, which is then read out of detector 40 to processor 46. This readout is typically performed in raster sequence with the shift values of the other detector elements, so that the shift values are read out in the same manner as pixel values are read out of a conventional image sensor.

Alternatively, at least a portion of comparator logic 56 (which is described in greater detail hereinbelow) may be located at the edge of the array of detector elements 41, rather than embedded in each detector element as shown here. Further alternatively or additionally, some or all of the raw signals captured by capacitors 54 may be transferred from detector 40 to processor 46, which then performs the shift computation at the picture level. As yet another alternative, comparator logic 56 may perform numerical and/or trigonometric operations on the raw signals, as well as comparison between the readings of the capacitors.

Figure 3:
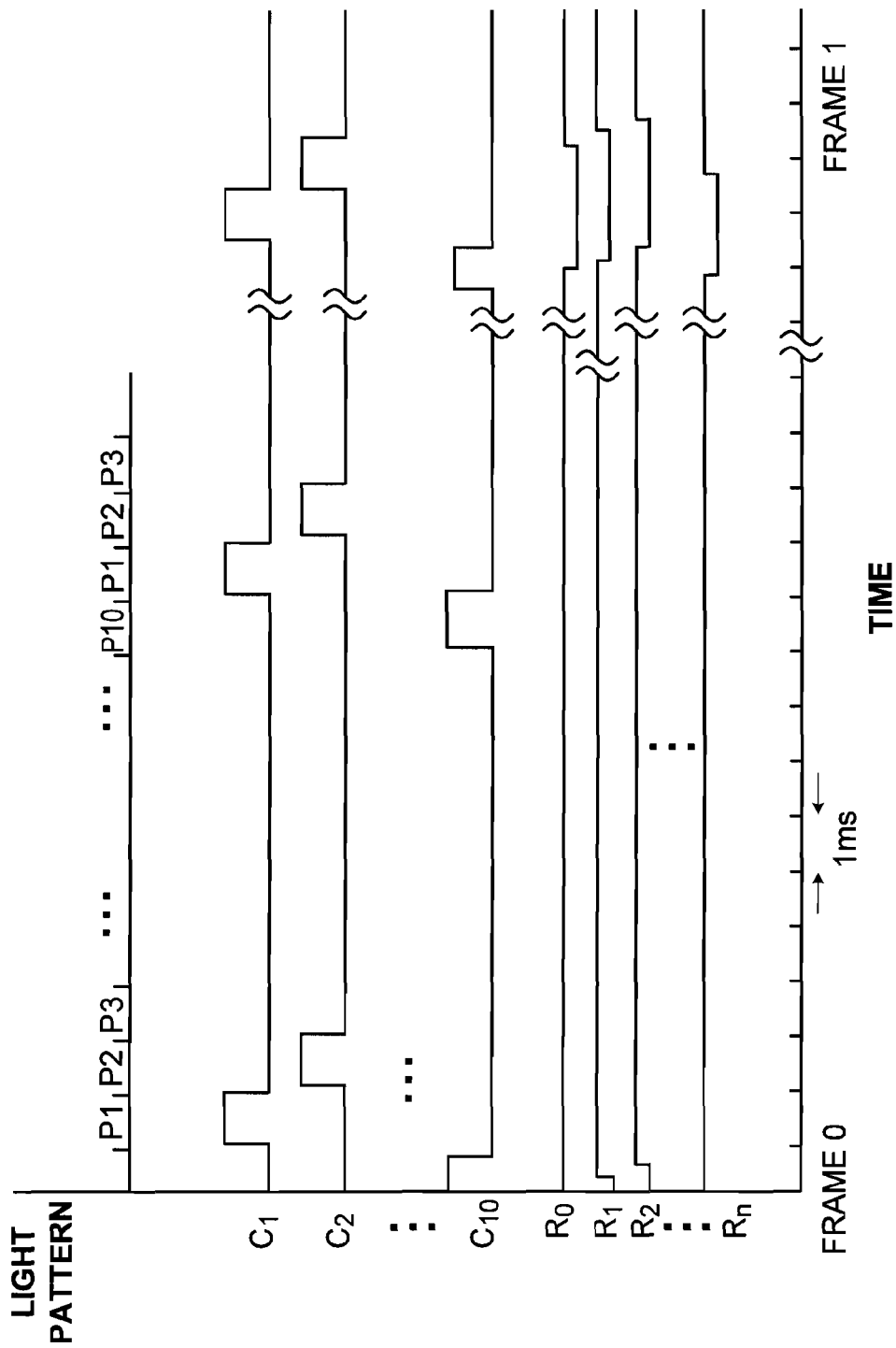
FIG. 3 is a timing diagram that schematically illustrates the operation of an illumination subassembly and detector elements in an imaging device for 3D mapping, in accordance with an embodiment of the present invention.

FIG. 3 is a timing diagram that schematically illustrates the operation of illumination subassembly 30 and detector elements 41, in accordance with an embodiment of the present invention. The illumination subassembly generates a temporal sequence of ten different spatial patterns of light, identified in FIG. 3 as P1 through P10. (A possible sequence of this sort is described hereinbelow with reference to FIGS. 4A-4C.) This sort of temporal sequence of different spatial light patterns is referred to herein as a time-coded illumination sequence or pattern.

The patterns are projected by subassembly 30 in predetermined time intervals. In this example, the intervals are 1 ms apart, but longer or shorter intervals may be used. Much longer intervals are generally undesirable if the object to be mapped is moving. Shorter intervals are possible, but may complicate and increase the power consumption of the circuitry. The millisecond-scale interval is convenient in that it can be implemented using low-speed timing and switching circuits and generates only moderate data transfer rates.

During each of the projection intervals, switch 52 conveys the charge from photodiode 50 to a different capacitor 54. The switch in each detector element 41 is synchronized with the alternation of the light pattern that is projected by illumination subassembly 30. Thus, capacitor C1 receives the charge during the interval of pattern P1, C2 during P2, and so forth up to C10 and P10, after which the sequence repeats, as illustrated by the lines marked C1, C2, . . . , C10 in FIG. 2. Consequently, the intensity of light that is incident on detector element 41 due to each of the light patterns is recorded by the respective capacitor. Repetition of the pattern (every 10 ms in this example) is useful in averaging out artifacts that may arise due to motion of object 28.

Switches 52 in all elements 41 of detector 40 are typically synchronized by a global clock, i.e., all of the switches operate at the same time and in the same way in order to match the timing of the varying light patterns. On the other hand, readout of the values collected and stored by elements 41 may be performed row-by-row, using a local clock, in a "rolling shutter" arrangement, for example. In this scheme, the readout periods of the successive rows R0, R1, . . . , Rn of elements 41 are staggered over the duration of each frame. (The readout period of each row is illustrated by the short period during which the signal for the row is shown to go low in FIG. 3.) The use of a rolling shutter for readout, notwithstanding the global timing of the switches, may be advantageous in terms of ease of implementation and enhanced overall sensitivity to light. The lack of synchronization between the global clock that controls the illumination and sensing and the local clock that controls readout has no adverse effect on the performance of device 22.

This sort of hybrid approach, in which switching operations within the detector elements in a matrix are globally clocked, while readout is controlled separately row by row, by a rolling clock, may similarly be used in implementing other sorts of local processing functions, as well.

FIGS. 4A, 4B and 4C schematically show patterns P3, P4, and P10, respectively, according to an embodiment of the present invention. These patterns comprise bright stripes 60 and dark stripes 62, wherein the widths (i.e., the spatial frequencies) of the stripes vary from pattern to pattern. Pattern P1 may be totally bright, while P2 is totally dark, in order to provide baseline values for comparator logic 56. In P3 (FIG. 4A), stripes 60 and 62 each take up half the field. Assuming sensor 40 to comprises 256 columns of detector elements 41, illumination subassembly 30 may be controlled so that the stripes in P3 are each 128 pixels wide. In P4 (FIG. 4B), the alternating bright and dark stripes are 64 pixels wide. The stripe widths decrease by half in each successive interval: P5—32 pixels; P6—16 pixels; P7—8 pixels; P8—4 pixels; P9—2 pixels; P10 (FIG. 4C—stripes not to scale)—one pixel.

This succession of patterns associates a unique eight-bit code with each X-coordinate value. Each bit of the code corresponds to the bright/dark status of the column of pixels at that X-coordinate in an image of a reference plane during the corresponding interval, from P3 through P10. (The reference plane is located at a known distance from device 22 and is used as the baseline Z-coordinate for converting X-direction shift values to Z-direction depth values by triangulation.) Associating the value 1 with bright stripes 60, and 0 with dark stripes 62, the leftmost column will have the value (1111111), since the pixels in this column are bright during every one of the intervals, whereas the rightmost column will be (00000000). The binary code values of the intermediate columns increase in succession from right to left.

Alternatively, any other suitable sort of time-coded sequences of patterns may be used. The use of vertically-striped patterns is appropriate in the system configuration shown in FIG. 1, since depth variations will result only in X-direction shifts of the pattern (as explained in the above-mentioned PCT publications). Hence, no Y-direction coding is required. Alternatively, however, in other schemes, the Y-coordinates may be coded, as well.

As another example, in some cases it may be advantageous to use multiple frames of time-coded data to derive depth. For example, instead of using a single frame with ten storage components in each detector element as in the embodiment described above, depth data can be derived by combining signals from a given number of successive frames, using four storage components in each detector element, with each time-coded sequence of projected patterns extending over the given number of successive frames. In this sort of embodiment, a detector with a high frame rate (for example, 100 frames/sec or more) can be used in order to reduce the influence of motion artifacts on depth measurement.

Another alternative is to group neighboring detector elements: For instance, with four storage components in each detector element, a group of four neighboring elements will have 16 storage components. The signals from the neighboring detector elements in each such group can be combined to provide depth readings with enhanced depth resolution. For this purpose, the storage components in the different detector elements in the group may be clocked at different times, so that each storage component receives charge due to projection of a different pattern. Alternatively, the projected patterns may be modified to provide local spatial coding over the different detector elements in each group, without necessarily applying different clocks to the different elements. In this manner, the local spatial information can be combined with temporal information to decode the patterns and thus extract local shift (and hence depth) information.

In another embodiment, both of the above alternatives may be combined: The time-coded sequence of projected patterns may extended over multiple successive frames, and the patterns may be decoded by grouping neighboring detector elements. This sort of embodiment can be designed, with appropriate local spatial coding of the patterns, to use a conventional image sensor array, in which each detector element contains only a single storage component.

In practical terms, it may be difficult in some circumstances to properly distinguish between the binary values 0 and 1 at each pixel, especially when projecting the pattern with the finest spatial resolution. Furthermore, use of gray-scale patterns can be advantageous in achieving sub-pixel resolution in the shift computation. Thus, in an alternative embodiment, binary patterns (at low resolution) may be projected in alternation with grey-scale patterns, and the results may be combined to measure depth with enhanced reliability and resolution. The gray-scale pattern may comprise, for example, a shifted-sine pattern, such as that described by Guan et al., in "Composite Structured Light Pattern for Three-Dimensional Video," *Optics Express* 11:5 (2003), pages 406-417, which is incorporated herein by reference.

Figure 5:
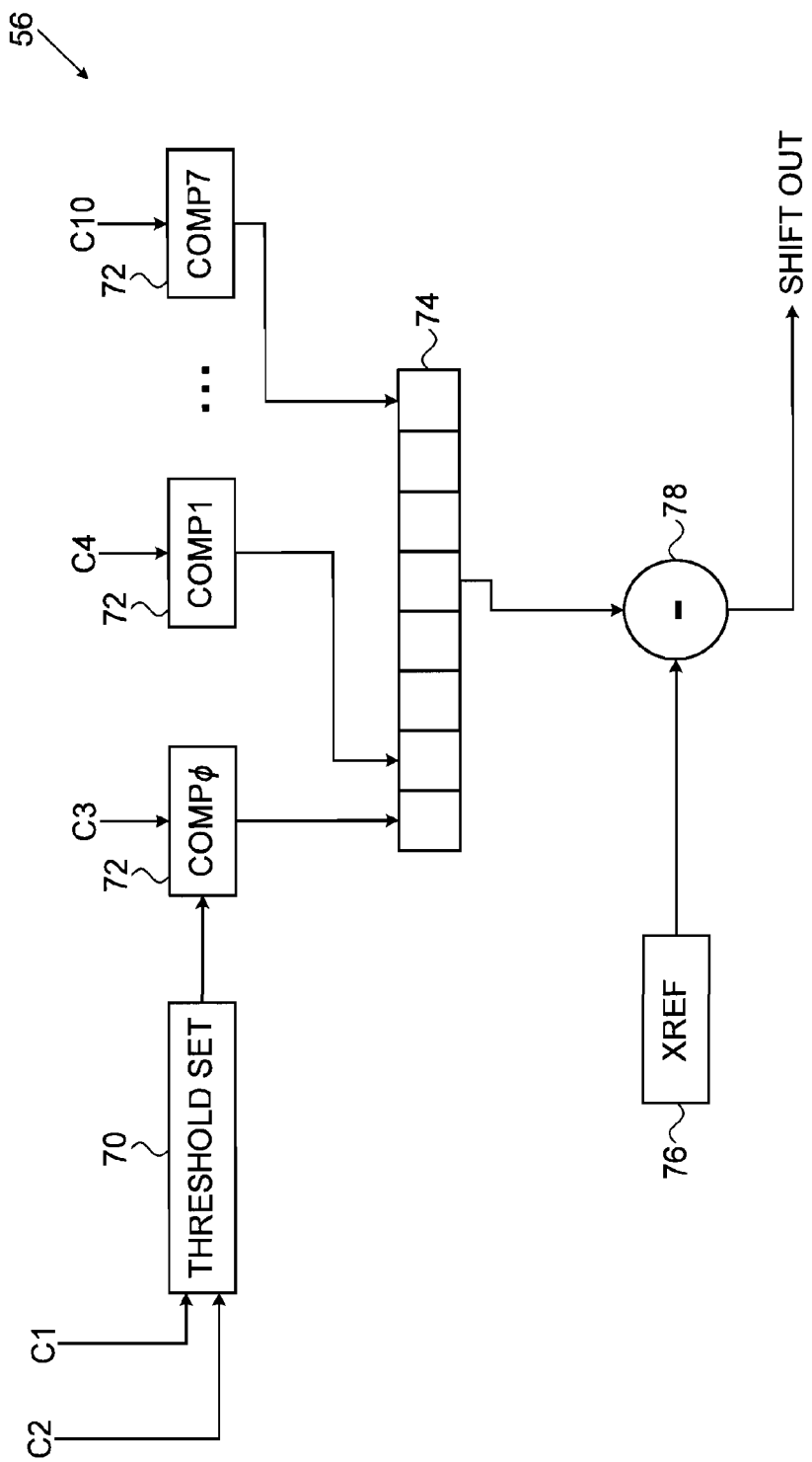
FIG. 5 is a block diagram that schematically shows details of comparator logic in a processing circuit embedded in an imaging device, in accordance with an embodiment of the present invention.

FIG. 5 is a block diagram that schematically shows details of comparator logic 56, in accordance with an embodiment of the present invention. The charge values (or equivalent voltages) of capacitors C1 and C2 are input to a threshold setting block 70 As explained above, switch 52 in each detector element 41 is synchronized so that these capacitors respectively receive the charge output by photodiode 50 while illumination subassembly 30 projects patterns P1 and P2. Assuming pattern P1 is all bright and P2 is all dark, C1 and C2 will give the signal bounds for each pixel: C1 indicates the expected signal level when the pixel is illuminated by subsequent patterns, while C2 indicates the baseline "dark" level due to ambient light.

Block 70 sets one or more discrimination thresholds based on the C1 and C2 values. For example, a single threshold may be set at the average of C1 and C2. This threshold is input to an array of comparators 72, one for each of the remaining capacitors 54, C3 through C10. Alternatively, the threshold can be set as the average of max(C1, . . . , C10) and min(C1, . . . , C10) (on the assumption that there is no word of ten zeros or ten ones). In this alternative scheme, the values of C1 and C2 can provide useful depth information, rather than being used only for threshold setting.

As an alternative to the sort of threshold-based discrimination that is described above, complementary patterns (such as 101010 and 010101) may be projected in alternation. The resulting signals are compared locally in each detector element 41. If the first signal at a given pixel is larger than the second by at least a certain minimum difference, then it is assigned the value 1. Otherwise it gets the value 0.

Each comparator 72 compares the charge level of the respective capacitor to the threshold and outputs a bit value accordingly, for example, a "1" if the charge level is above threshold, and "0" if below. Alternatively, a single comparator (or an intermediate number of comparators) may be multiplexed among the capacitors. The result, in the example shown in FIG. 5, is an eight-bit output word 74, in which the MSB (contributed by C3) represents the bright/dark status of the corresponding pixel due to pattern P3, and the LSB (C10) represents the status due to P10. The comparison is typically performed at the conclusion of each cycle through the set of patterns P1 through P10, and the capacitors are then cleared for the next cycle.

If the image captured by subassembly 38 during a given cycle is of a flat object at the above-mentioned reference plane, then the value of word 74 will be the reference code value, XREF, for the corresponding X-coordinate. This reference value may be stored in a register 76 for each column of detector elements 41. A subtractor 78 takes a difference between the reference value in register 76 from the current value of word 74 in order to give the digital value of the X-direction shift of the pattern at this pixel. Processor 46 translates the shift into the corresponding depth value. Alternatively, detector 40 may simply output raw words 74, and the subtraction may be performed by processor 46 or other circuitry. Further alternatively, detector elements 41 may comprise additional arithmetic logic to convert the shifts into depth values, so that detector 40 outputs a depth map directly.

Alternative implementations of the capacitors and associated logic may also be used. For example, a smaller number of capacitors may be incorporated in each detector element 41, and the operation of switch 52 may be timed so that each capacitor receives charge during two (or more) of the pattern intervals. In this case, each capacitor may store two (or more) bits of information as analog charge levels. Comparator logic 56 may then apply multiple thresholds in order to distinguish between the possible charge states and extract the appropriate multi-bit values from each capacitor.

FIG. 6 is a schematic pictorial view of an illumination subassembly 80, which is operative to project a time-coded sequence of spatial patterns, in accordance with another embodiment of the present invention. Subassembly 80 may be used in place of the subassembly 30 in device 22 (FIG. 1), for example. Subassembly 80 comprises multiple parallel radiation sources 82, 84, 86, 88, . . . , such as infrared (IR) laser diodes, which may be mounted side-by-side on a substrate 90, such as a printed circuit board. The sources are turned on and off in succession by a control circuit 102, so that typically one source is lit at any given time during the operation of subassembly 80.

To create the desired time-coded patterns, sources 82, 84, 86, 88, . . . , transilluminate respective areas 94, 96, 98, 100, . . . , of a patterned element 92. Typically, projection optics (such as lens 35, shown in FIG. 1) project the respective patterns onto the field of view of device 22. Although only four sources and corresponding areas are shown in FIG. 6, in practice larger numbers of sources and corresponding areas can be used to create a larger number of spatial patterns. Furthermore, although element 92 is shown in the figure as a single plate, areas 94, 96, 98, 100, . . . , within element 92 may alternatively be implemented as separate components. Sources 82, 84, 86, 88, . . . , may be arranged in a linear array, as shown in FIG. 6, or they may alternatively be arranged in a two-dimensional array, with areas 94, 96, 98, 100, . . . , configured accordingly.

Patterned element 92 is designed and fabricated so that each area 94, 96, 98, 100, . . . , creates a different spatial pattern, such as the patterns shown in FIGS. 4A, 4B and 4C. For this purpose, element 92 may comprise, for example, a suitable diffractive optical element (DOE) or micro-lens array (MLA), for projection of the pattern. The density and/or other aspects of the pattern on element 92 may vary from area to area, so that as each radiation source 82, 84, 86, 88, . . . , is turned on, it creates a different spatial pattern in the time-coded sequence.

In an alternative embodiment, a beam from a single source (as in subassembly 30) is scanned from area to area over element 92, thereby illuminating each of areas 94, 96, 98, 100, . . . , and creating the corresponding spatial patterns in turn.

Although the embodiments described above relate to a particular depth mapping configuration, the principles of the devices and methods presented above may be applied in other configurations, and for applications other than depth mapping.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for imaging, comprising:
capturing images of an object using a matrix comprising multiple rows of detector elements;
performing a processing operation in the detector elements under control of a global clock with a first predetermined clock period; and
reading out results of the processing operation row by row under control of a rolling clock with a second predetermined clock period, which is different from and unsynchronized with the global clock.

2. The method according to claim 1, wherein capturing the images comprises generating electrical charge in each of the detector elements, and
wherein performing the processing operation comprises applying a logical operation to the charge in each of the detector elements in order to generate a digital value, which is read out under the control of the rolling clock.

3. The method according to claim 2, wherein capturing the images comprises illuminating the object with radiation that varies over time under the control of the global clock, and generating the charge responsively to the radiation that is received from the object at the detector elements.

4. The method according to claim 3, wherein illuminating the object comprises applying the radiation in a time-coded pattern, and wherein the digital value generated by the logical operation comprises a digital shift value, and wherein reading out the results comprises reading out and processing digital shift values read out from the matrix of detector elements in order to generate a depth map of the object.

5. The method according to claim 1, wherein capturing the images comprises generating electrical charge in each of the detector elements, and
wherein performing the processing operation comprises switching the charge among different charge storage components associated with the detector elements in synchronization with the global clock.

6. The method according to claim 5, wherein performing the processing operation comprises making a comparison of the charge stored in each of the charge storage components to a threshold level and generating digital values in response to the comparison, and
wherein reading out the results comprises reading out the digital values.

7. The method according to claim 6, wherein generating the digital values comprises generating bit values responsively to the comparison, and concatenating the bit values to generate the digital values.

8. The method according to claim 1, wherein reading out the results comprises outputting the data from the detector elements row by row using a rolling shutter controlled by the local clock.

9. Apparatus for imaging, comprising:
a matrix comprising multiple rows of detector elements, which is configured to capture images of an object;
embedded processing circuitry, which is configured to perform a processing operation in the detector elements under control of a global clock with a first predetermined clock period; and
a readout circuit, which is configured to read out results of the processing operation under control of a rolling clock with a second predetermined clock period, which is different from and unsynchronized with the global clock.

10. The apparatus according to claim 9, wherein the detector elements are configured to generate electrical charge responsively to the images, and
wherein the processing circuitry is configured to apply a logical operation to the charge in each of the detector elements under the control of the global clock in order to generate a digital value, which is read out under the control of the rolling clock.

11. The apparatus according to claim 10, and comprising an illumination subassembly, which is configured to illuminate the object with radiation that varies over time under the control of the global clock, wherein the detector elements generate the charge responsively to the radiation illuminating the object.

12. The apparatus according to claim 11, wherein the illumination subassembly is configured to apply the radiation in a time-coded pattern, and wherein the digital value generated by the embedded processing circuitry comprises a digital shift value, which is read out by the readout circuit and which is converted by a processor into a depth coordinate in order to generate a depth map of the object.

13. The apparatus according to claim 9, wherein the detector elements are configured to generate electrical charge in each of the detector elements, and
wherein the embedded processing circuitry comprises, in each of the detector elements, multiple charge storage components and a switch, which is configured to switch the charge from the detector elements among the charge storage components associated with the detector elements in synchronization with the global clock.

14. The apparatus according to claim 13, wherein the processing circuitry comprises comparator logic, which is configured to make a comparison of the charge stored in each of the charge storage components to a threshold level, and to generate digital values in response to the comparison, and
wherein the readout circuit is configured to read out the digital values.

15. The apparatus according to claim 14, wherein the comparator logic is configured to generate bit values responsively to the comparison, and to concatenate the bit values to generate the digital values.

16. The apparatus according to claim 9, wherein the readout circuit is configured to output the data from the detector elements row by row using a rolling shutter controlled by the local clock.

* * * * *